United States Patent [19]

Ichise et al.

[11] Patent Number: 4,897,714
[45] Date of Patent: Jan. 30, 1990

[54] PASSENGER VEHICLE SERVICE SYSTEM

[75] Inventors: Atsushi Ichise; Yoshiyuki Kondo, both of Tokyo; Masatoshi Hirayasu, Kanagawa; Kenji Inoue, Tokyo, all of Japan

[73] Assignee: Sony Corporation, Tokyo, Japan

[21] Appl. No.: 148,571

[22] Filed: Jan. 26, 1988

[30] Foreign Application Priority Data

Feb. 25, 1987 [JP] Japan .................. 62-042304

[51] Int. Cl.$^4$ .................. H04N 5/00; H04N 7/18; H04B 3/50
[52] U.S. Cl. .................. 358/86; 358/93; 358/254; 340/825.08; 340/825.22; 340/825.28; 455/5; 455/31
[58] Field of Search .................. 358/86, 93, 108, 254, 358/255; 455/3, 4, 5, 6, 31; 297/146, 163, 191; 340/825.06, 825.07, 825.08, 825.17, 825.22, 825.28, 825.29, 825.52

[56] References Cited

U.S. PATENT DOCUMENTS

| | | |
|---|---|---|
| 3,602,891 | 8/1971 | Clark et al. . |
| 3,757,225 | 9/1973 | Ulicki . |
| 3,997,718 | 12/1976 | Ricketts et al. . |
| 4,247,106 | 1/1981 | Jeffers et al. . |
| 4,428,078 | 1/1984 | Kuo . |
| 4,513,315 | 4/1985 | Dekker et al. . |
| 4,521,021 | 6/1985 | Dixon . |
| 4,554,579 | 11/1985 | Citta . |
| 4,573,072 | 2/1986 | Freeman .................. 358/86 |
| 4,584,603 | 4/1986 | Harrison . |
| 4,591,906 | 5/1986 | Morales-Garza et al. . |
| 4,630,821 | 12/1986 | Greenwald . |
| 4,647,980 | 3/1987 | Steventon et al. . |
| 4,684,981 | 8/1987 | Toyoshima et al. . |

FOREIGN PATENT DOCUMENTS

| | | |
|---|---|---|
| 103438 | 3/1984 | European Pat. Off. . |
| 144770A | 6/1985 | European Pat. Off. . |
| 0230280 | 7/1987 | European Pat. Off. . |
| 54-105499 | 7/1979 | Japan . |
| 57-199369 | 12/1982 | Japan . |
| 59-15387 | 1/1984 | Japan . |
| 59-15388 | 1/1984 | Japan . |
| 2158610A | 4/1984 | United Kingdom . |

OTHER PUBLICATIONS

"Design Technique for Multiplexing Asynchronous Digital Video and Audio Signal," by J. H. Stott, IEEE Transactions on Communications, vol. COM-26, No. 5, May, 1978.
Boeing Electronics Company brochure entitled "Putting the Futrue of Passenger Services and Entertainment at your Fingertips," 1987, six pages.
Boeing, "Proceedings of the SCAR Conference–Part 2," Mar., 1977, pp. 854 and 864.

*Primary Examiner*—Tommy P. Chin
*Attorney, Agent, or Firm*—Limbach, Limbach & Sutton

[57] ABSTRACT

A system and method for providing service in a passenger vehicle having a plurality of passaenger seats. Tree-structured menu data are transmitted from a head end apparatus to a plurality of terminal units (each provided at one of the passenger seats) and the menu data are displayed at each terminal unit. Request signals indicating menu times selected by the passengers are returned to the head end apparatus, where they may be centrally processed and displayed, in order to provide improved service for the passengers.

21 Claims, 10 Drawing Sheets

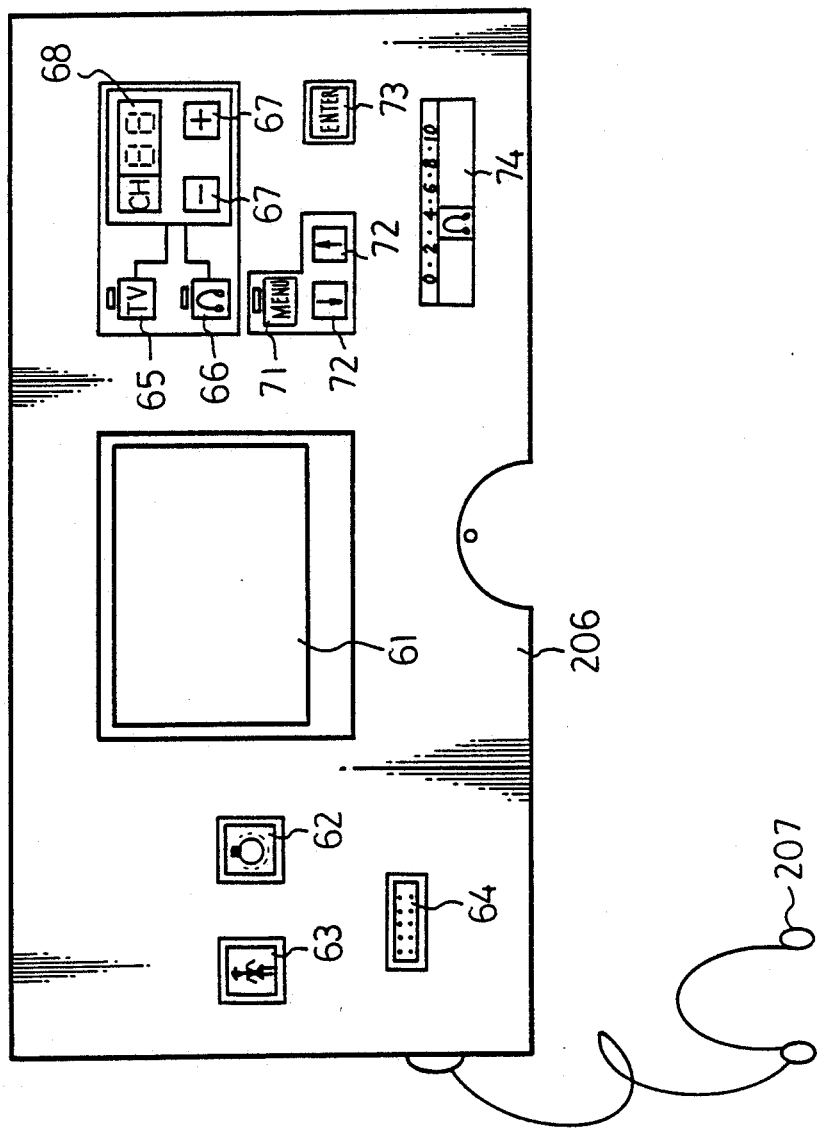

*FIG. 4A*

```
* MAIN MENU *

MEALS
  DRINKS
  GAMES
  NEXT PAGE

MOVE CURSOR TO
ITEM THEN ENTER
```

*FIG. 4B*

```
* DRINKS *

WINE
  WHISKY
  BEER
  NEXT PAGE

MOVE CURSOR TO
ITEM THEN ENTER
```

*FIG. 4C*

```
* MEALS *

STEAK
  CHICKEN
  SEAFOOD
  NEXT PAGE

MOVE CURSOR TO
ITEM THEN ENTER
```

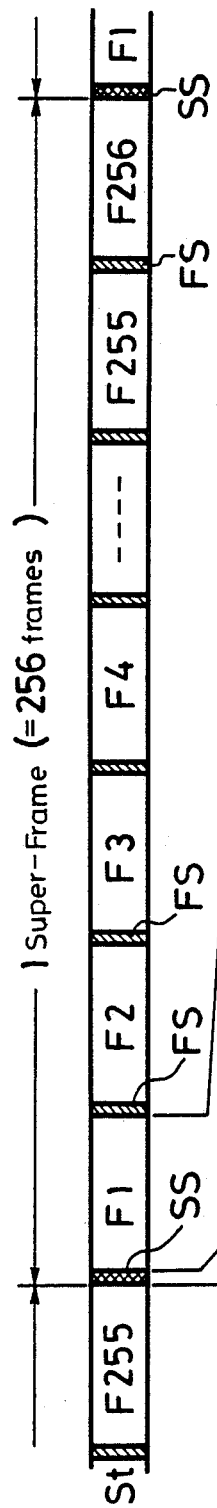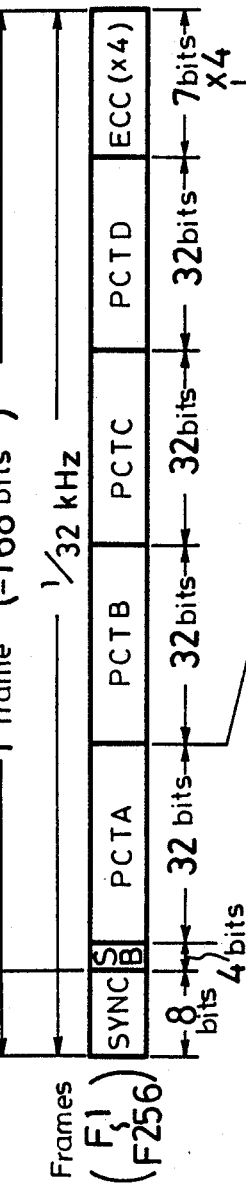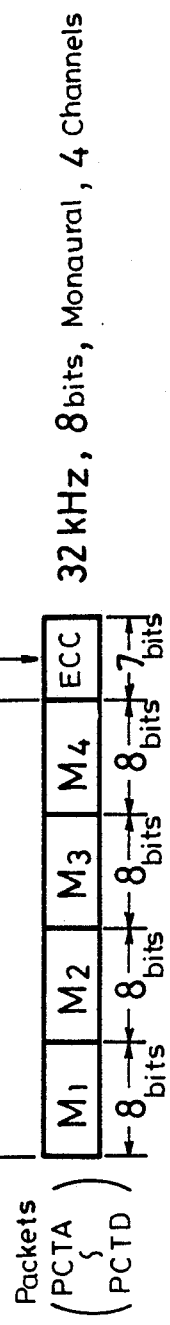
F I G. 6A
F I G. 6B
F I G. 6C

PASSENGER VEHICLE SERVICE SYSTEM

FIELD OF THE INVENTION

The present invention relates generally to passenger vehicle service systems. More particularly, the invention relates to passenger vehicle service systems capable of transmitting menu information from a central station to a plurality of terminal units each located at or near a passenger seat in a passenger vehicle, and capable of transmitting menu request signals from each terminal unit to the central station.

DESCRIPTION OF THE PRIOR ART

In conventional passenger aircraft, attendants serve the respective passengers, such as by responding to their requests for meals, drinks, and souvenirs.

In conventional passenger vehicles, however, each attendant visits passengers sequentially to receive and respond to the respective requests of the passengers, so that the menu of available items is not simultaneously available to all the passengers for simultaneous selection by all the passengers. Also, when a passenger makes a request, the attendant must visit that passenger's seat to answer the request.

SUMMARY OF THE INVENTION

The invention is an improved passenger vehicle service system, having a simplified arrangement, which permits passenger attendants to provide speedy service to the passengers while also alleviating the labor of each attendant considerably. The invention also permits passengers to select menu items from their seats, and to do so freely and in an interactive manner.

In a preferred embodiment, the system of the invention comprises:

a head end apparatus having memory means for storing menu data, and means for recovering said menu data for subsequent transmission, where said menu data includes at least one menu and each menu includes at least one menu item;

a plurality of terminal units, each provided at a respective one of a plurality of passenger seats, each terminal unit having means for displaying said menu data, means for selecting a menu item from among said menu data, and means for generating a request signal which indicates the menu item selected by the selecting means and includes an address signal identifying said terminal unit; and means for transmitting said menu data from said head end apparatus to the terminal units and for transmitting the request signals from the terminal units to the head end apparatus.

These and other features and advantages of the present invention will become apparent from the following detailed description of the preferred embodiments taken in conjunction with the accompanying drawings, throughout which like reference numerals designate like elements and parts.

BRIEF DESCRIPTION OF THE DRAWINGS

Each of FIGS. 1A and 1B is a block circuit diagram showing the whole arrangement of an embodiment of an aircraft service system according to the present invention;

FIG. 2 is a plan view showing a selection and display apparatus included in the system of FIGS. 1A and 1B;

Figure 5:
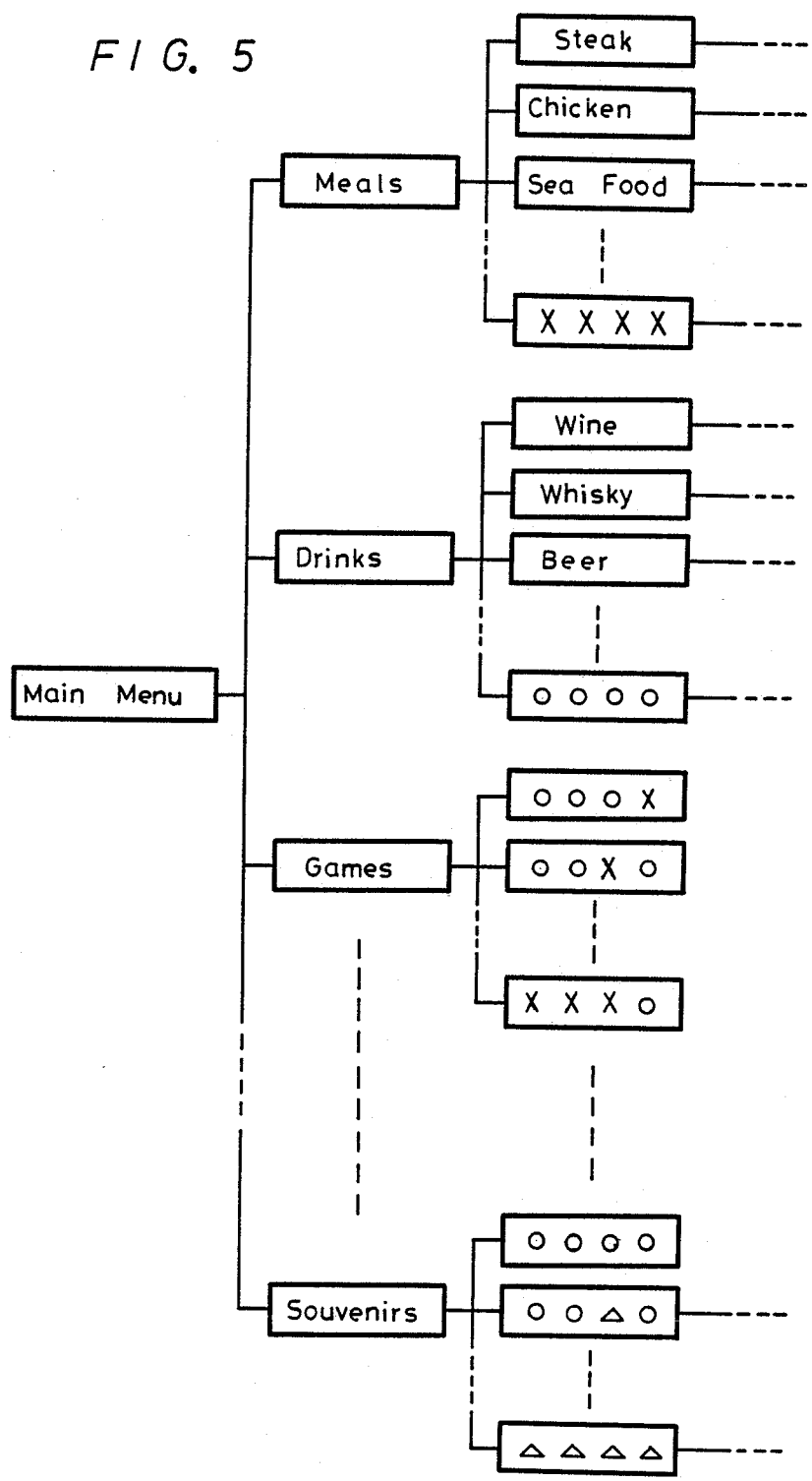
Figure 7A:
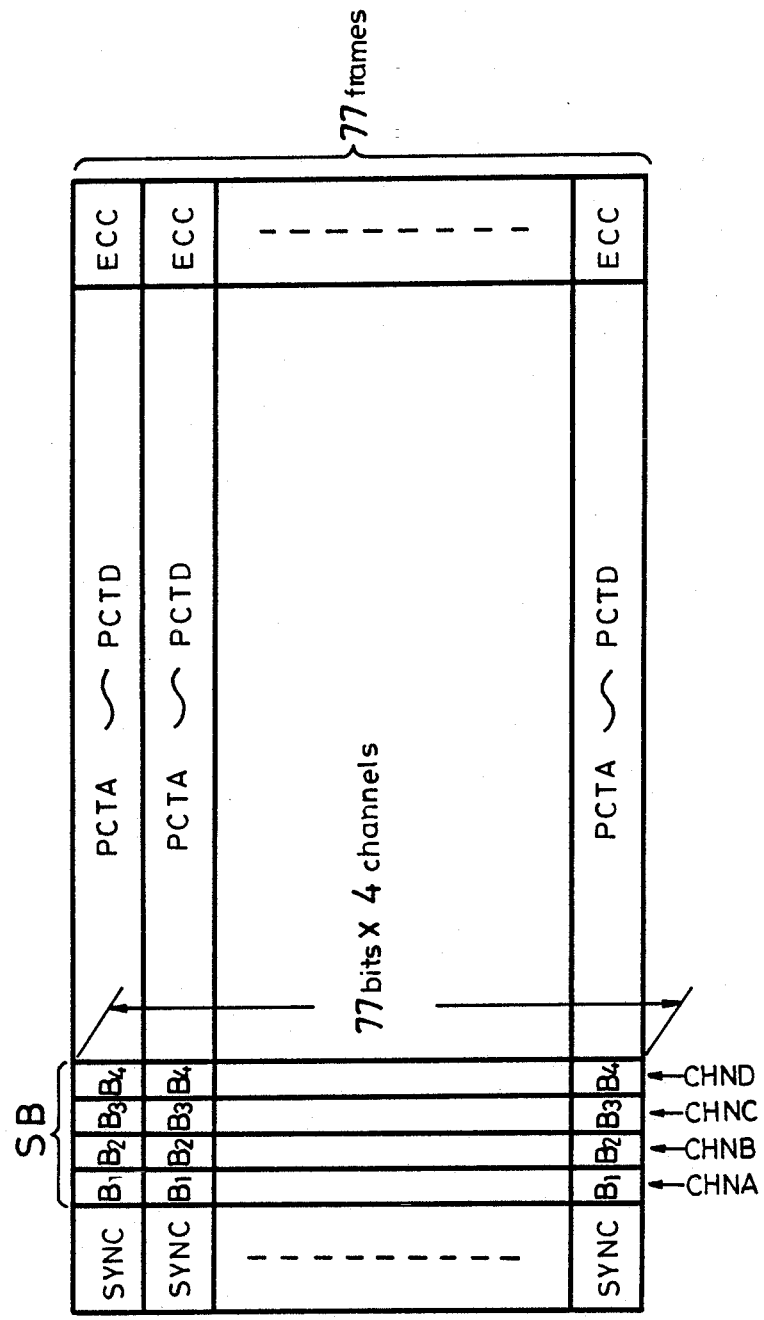
Figures 7B, 7C, 7D:
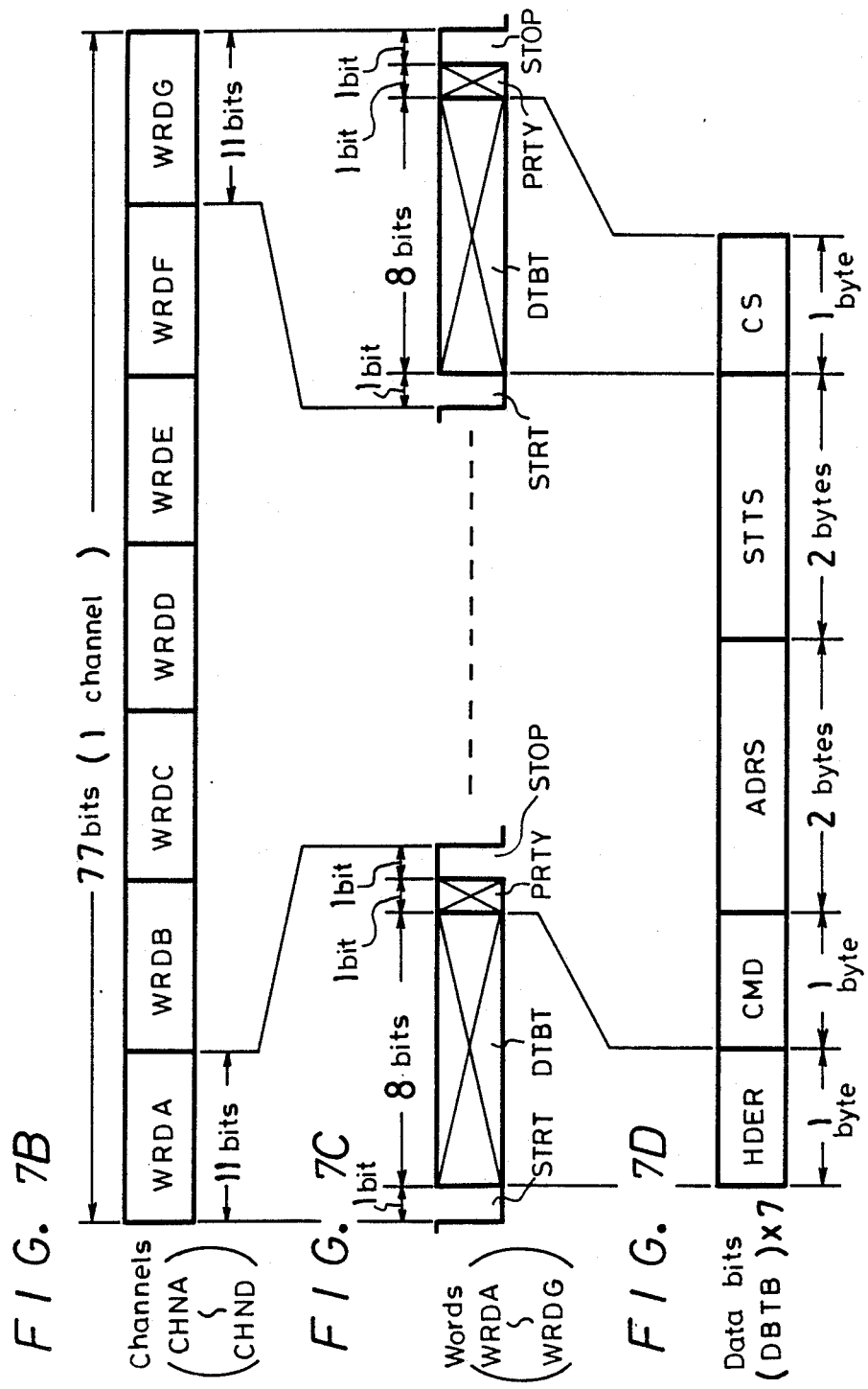
Figure 8:
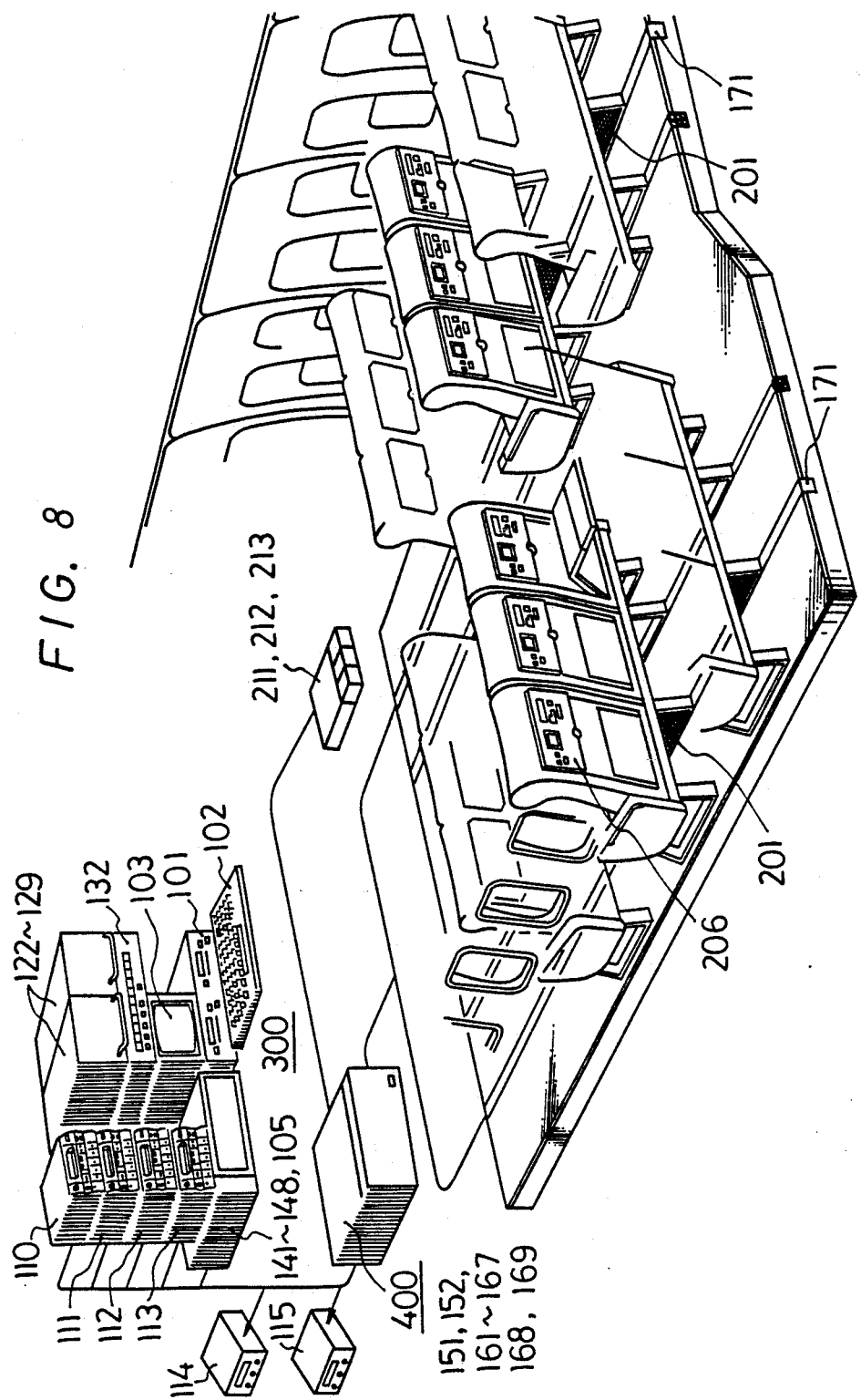

Each of FIGS. 4A through 4C is a schematic representation of menu data displayed by the system of the invention;

FIG. 5 is a schematic diagram of a preferred structure for menu data transmitted by the system of the invention;

FIGS. 6A–6C and 7A–7D are diagrams showing signal formats used in the system of the invention; and FIG. 8 is a perspective view of a preferred embodiment of the invention.

DESCRIPTION OF THE PREFERRED EMBODIMENTS

Figure 1A:
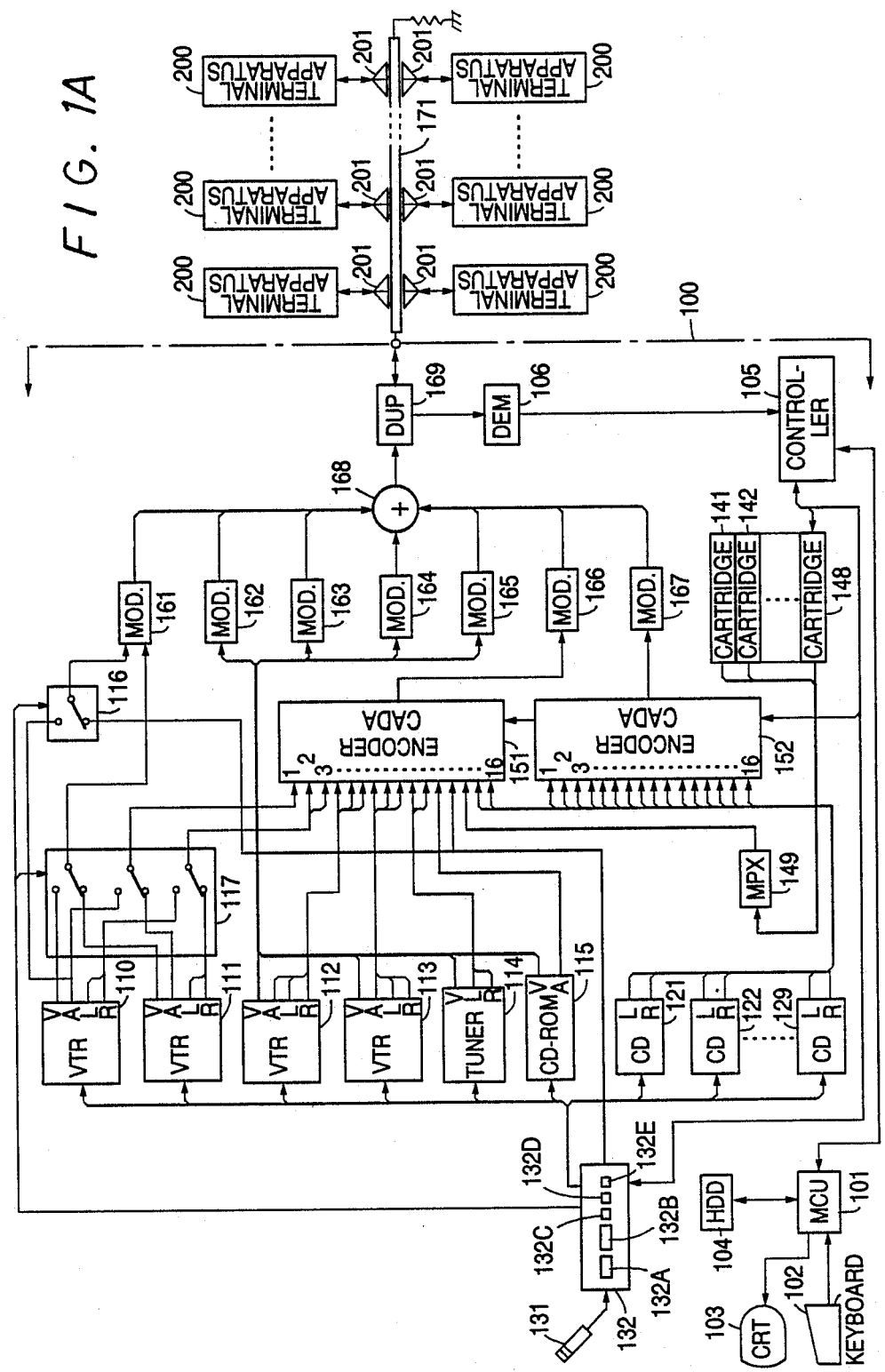
Figure 1B:
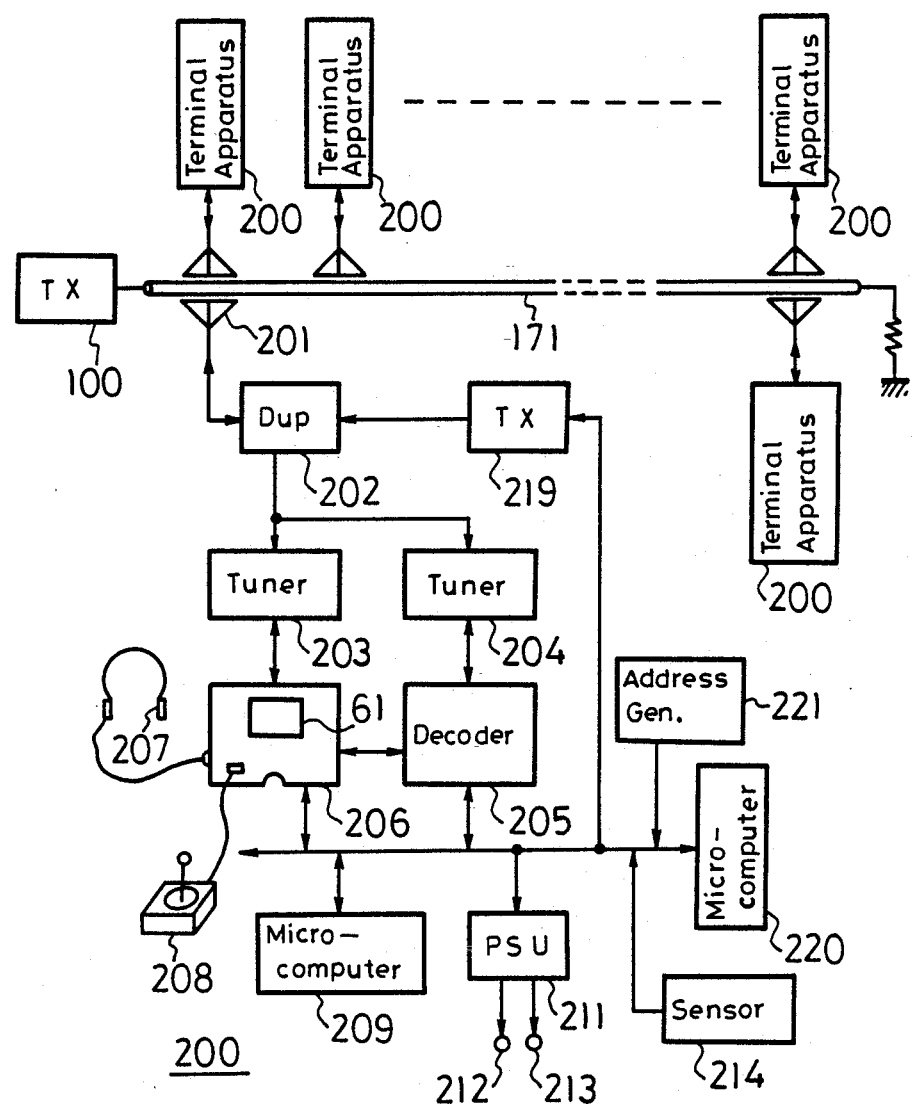

In FIGS. 1A and 1B, reference numeral 100 designates a transmitter provided in a crew's room or the like in an aircraft, and each numeral 200 designates a terminal unit serving a different one of the aircraft passenger seats. The embodiment of FIGS. 1A and 1B includes a frequency-division-multiplex system including seven "down" channels for transmitting signals from transmitter 100 to terminal units 200 and two "up" channels for transmitting signals from terminal units 200 to transmitter 100. The down channels are used to transmit a variety of information signals, control signals and polling signals. On the other hand, the up channels are used both to transmit data generated by the passengers at arbitrary times from the terminal units 200, and data generated in response to polling signals from transmitter 100.

In transmitter 100, reference numerals 110–113 designate video tape recorders (VTRs) each of which may be an 8 mm video tape recorder, for example. VTR 110 is used for the override operation and is loaded with a cassette tape explaining how to put on a life-jacket or the like. Each of video tape recorders 111, 112, and 113 is loaded with a cassette tape of a video program such as a movie.

Each of video tape recorders 111, 112, and 113 is respectively provided with a terminal V for outputting a reproduced video signal and with terminals L, R and A for outputting reproduced audio signals.

Video tape recorders 110 through 113 supply video signals V, stereo audio signals L and R in a first language, and monaural audio signals A in a second language.

Reference numeral 114 designates a television tuner, and 115 a still image reproducer, e.g. a CD-ROM player, which is loaded with a compact disk in which airport maps, various procedures, and other information may be recorded. Each of units 114 and 115 supplies video signals V and audio signals L, R and A.

Reference numerals 121–129 designate compact disk (CD) players which supply stereo audio signals L, R, which may be music signals, for example.

The FIG. 1A system includes microphone 131 for making announcements from within the cabin, AV control unit 132, announce switch 132A, override switch 132B, and pause switches 132C–132E for commanding VTRs 111–113 to stop or pause.

The FIG. 1A system also includes memory units 141–147 (each of which may be, for example, a ROM cartridge for use in a conventional personal computer such as the MSX standard personal computer) in which software programs such as games or the like may be written, and RAM cartridge 148 in which may be stored programs and data such as a menu or the like indicating services available in the cabin. The programs and data from cartridges 141-148 are time-division-multiplexed by multiplexer 149 for transmission as a serial signal to CADA encoder 151, as will be described later.

CADA (cable digital audio/data transmission) encoders 151 and 152 encoders, are of the type described in U.S. Pat. No. 4,684,981, issued Aug. 4, 1987 to Toyoshima, et al. Each of CADA encoders 151 and 152 pulse code modulates ("PCM-codes") and time-division-multiplexes 16-channel monaural audio signals (or 8-channel stereo audio signals) and a command signal (to be described below) for controlling one or more of terminal units 200. The multiplexed signals generated in each of units 151 and 152 have substantially the same band width as that of the ordinary video signal. The format of the PCM signals generated in units 151 and 152 will be described later.

The FIG. 1A system also includes modulators 161 through 167 each of which preferably includes an amplitude modulator of the type that produces VSB (vestigial sideband) signals, duplexer 169 which separates signals in the down channels and those in the up channels, and controller 105 comprising a microcomputer for controlling the above-mentioned respective circuits and the terminal units 200. The controller 105 is supplied with commands, data, and other signals from the terminal units 200 through duplexer 169 and demodulator 106.

Master control unit 101 comprises a microcomputer for centrally controlling and monitoring operation of the overall system including transmitter 100 and terminal units 200. For this purpose, master controller 101 is connected with controller 105, keyboard 102 for inputting data, CRT display 103 for monitoring data, and external storage unit 104, which may be a floppy or hard disk drive (HDD).

Normally, the video signal V from the VTR 111 is supplied to modulator 161 through a switching circuit 117. On the other hand, video signals V from VTRs 112-115 are respectively supplied to modulators 162-165 to be modulated in the same manner as are video signals to be broadcast in an ordinary television broadcasting system. Modulators 161-165 output modulated signals, of the type broadcast by ordinary television broadcast systems, each occupying a different frequency channel. These modulated signals are supplied to adder 168.

Audio signals L, R, and A from video tape recorder 11 are supplied to CADA encoder 151 through switching circuit 117. Audio signals L, R and A from video tape recorders 112-115 and compact disk players 121-129 and output signals from multiplexer 149 are supplied to encoders 151 and 152 wherein these signals are converted into two time-division-multiplexed signals. These time-division-multiplexed signals are respectively supplied to modulators 166 and 167 to be modulated, so that modulated signals occupying vacant channels (i.e., channels other than those occupied by the modulated signals produced in modulators 161 through 165) emerge from units 166 and 167. The modulated signals emerging from units 166 and 167 are then supplied to adder 168.

Adder 168 thus frequency-multiplexes the modulated signals from the modulators 161 and 167 and outputs the resulting multiplexed signal.

This multiplexed signal is delivered through duplexer 169 to a leaky cable 171 as a signal for the down channels. Leaky cable 171 is preferably a coaxial cable having a spirally indented periphery so as to leak signals transmitted therein.

Leaky cable 171 is thus usually supplied with frequency-multiplexed video signals V from the VTRs 111-115 as well as encoded audio signals L, R and A reproduced from VTRs 111-115 and CD players 121-129, and programs and data from cartridges 141-148 which are time-division-multiplexed before they are frequency-multiplexed.

To make an announcement in the cabin, announce switch 132A is turned on. Actuation of switch 132A automatically generates a control signal for placing VTRs 111-115 and CD players 121-129 into a pause or stop mode, muting the circuits for reproducing their signals, and setting switching circuit 116 into the state shown in FIG. 1A so that a voice signal from microphone 131 is supplied from unit 132 through switching circuit 116 to modulator 161 to be modulated to an FM signal similar to the audio signal component of an ordinary broadcast television signal. This FM signal is supplied to the adder 168.

In this event, the voice signal from microphone 131 is also supplied from unit 132 to encoder 151, and the controller 105 supplies encoders 151 and 152 with a command signal indicative of an announce mode on the basis of a signal supplied from unit 132 which is indicative of actuation of announce switch 132A.

When an announcement is made in the cabin, a voice signal representative of the announcement is added to the signals normally supplied to adder 168 and a command signal indicative of the announce mode is delivered by modulator 161 and encoder 151.

When the announce switch 132A is turned off, the system is returned to the normal operating mode described above.

When override switch 132B is turned on to effect an override operation, VTRs 111-115 and CD players 121-129 are set into a pause or stop state and VTR 110 is set into a reproducing state by a control signal from unit 132, and switching circuits 116 and 117 are set into the state opposite the state shown in FIG. 1 by a control signal from unit 132 so that the reproduced signals V, L, R and A from the VTR 110 are supplied to modulator 161 and encoder 151.

In this event, controller 105 supplies encoders 151 and 152 with a command signal indicative of an override mode in response to a signal supplied from unit 132 which is indicative of actuation of the override switch 132B.

Thus, when an override operation is effected, the reproduced signals V, L, R and A from VTR 110 are transmitted in place of those signals from VTR 111 which are transmitted during the system's normal operating mode, and a command signal indicative of the override mode is also transmitted.

When the announce switch 132A is turned on during an override operation, switching circuit 116 and encoders 151 and 152 are controlled in such a manner that the audio signal from microphone 131 overrides the other signals.

A terminal unit 200 is provided for each passenger seat, and leaky cable 171 is arranged along the passenger seats.

In the terminal 200 shown in FIG. 1B, reference numeral 201 designates a transmitting and receiving antenna (or "coupler") which is arranged in the vicinity of the cable 171 so as to couple inductively with cable 171 for transmitting and receiving signals to and from transmitter 100 and terminal unit 200.

Tuner 203 selects any desired one of the modulated signals from modulators 161-165 and demodulates the original video signal V (and the audio signal A) from the selected modulated signal. Tuner 204 selects any desired one of the modulated signals from modulators 166 and 167 and demodulates the original time-division-multiplexed signal, that is, the time-division-multiplexed signal from the encoder 151 or 152, from the selected modulated signal.

Decoder 205 performs the inverse operations to the operations performed in encoders 151 and 152. Selection indicating apparatus 206 has a color display 61, and a variety of operational switches and connectors to which a head phone 207 and a joy stick 208 can be connected.

Personal computer 209, which may a personal computer of e.g. the MSX standard, performs display processing for color display 61. Each terminal unit 200 of the FIG. 1B system also includes passenger service unit (PSU) 211, reading light 212, attendant call light 213, transmitter 219 for the up channels, sensor 214 for detecting passenger conditions, such as whether a passenger is sitting on each seat, whether the seat belt at each is correctly fastened, and the like, microcomputer 220 for controlling the whole terminal unit 200, and address generator 221 for generating the address of the terminal unit 200 at which address generator is located. Each PSU 211 includes a switch unit for controlling each of lights 212 and 213.

FIG. 2 shows a preferred embodiment of selection indicating apparatus 206 of the FIG. 1A/1B system. Color display 61 may be, for example, an index-beam type flat television picture tube (CRT). Reference numeral 62 designates a reading light switch, 63 an attendant call switch, and 64 a connector to which joy stick 208 (shown in FIG. 1B) may be connected.

Television switch 65 selects the reproduced signals V, L, R and A from the VTRs 111-115, music switch 66 selects the reproduced signals L, R from CD players 121-129, channel up/down switches 67 select desired ones of the reproduced signals (channels) selected by the switch 65 or 66, and indicator 68 digitally indicates a channel number corresponding to a channel selected by switches 67.

Menu switch 71 displays a menu on display 61, cursor keys (switches) 72 move a cursor up and down on display 61, enter key 73 validates an item specified by the cursor, and sliding adjuster 74 adjusts the volume of head phones 207.

Figure 3:
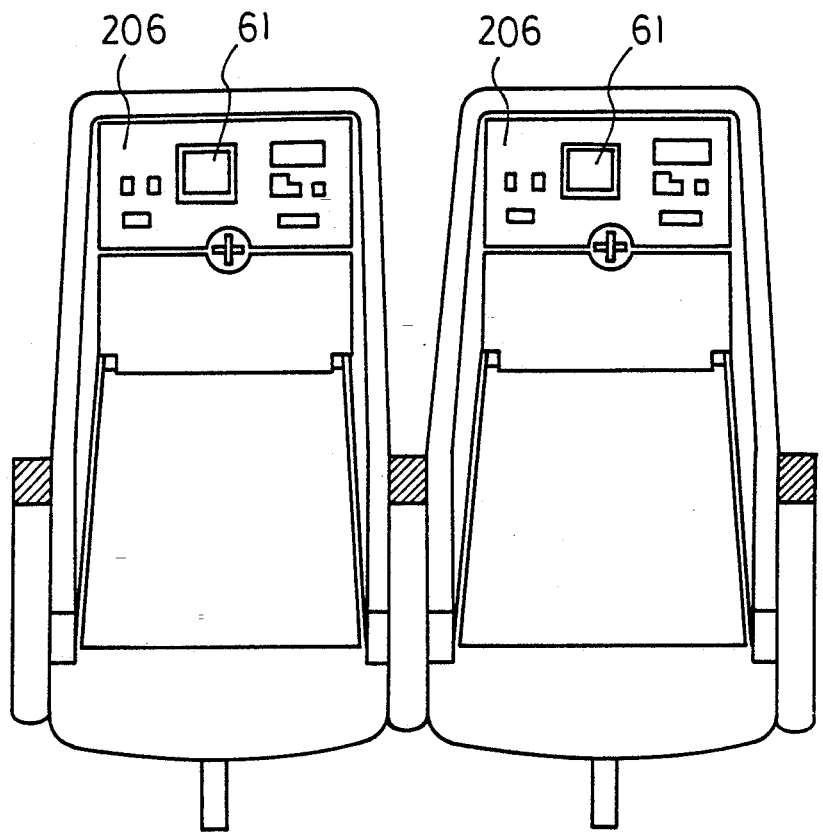
FIG. 3 is a plan view of two units of the selection and display apparatus of the invention, each mounted on the rear surface of a different passenger seat.

Each selection indicating apparatus 206 is preferably installed on the back of a passenger seat in front of the passenger using such apparatus 206, as shown in FIG. 3.

In the system's normal operating mode, the frequency-multiplexed signal delivered to leaky cable 171 is picked up by the antenna 201 and supplied to the tuners 203 and 204 through a duplexer 202.

When switch 65 is pressed, the terminal unit 200 is set into a television mode. Next, switches 67 are pressed to select one of the output signals from modulators 161-165, that is, one of the reproduced signal V from the VTRs 111-115. The act of pressing switches 67 causes tuner 203 to supply the selected signal V to display 61. At the same time, one of the output signals from modulators 166 and 167 is selected in tuner 204 and the output signal from the appropriate one of encoders 151 and 152 is supplied to decoder 205 wherein the audio signals L, R and A of the channel selected by the switches 67 are decoded and supplied through selection indicating apparatus 206 to head phones 207.

Thus, by repeatedly operating switches 65 and 67, the passenger can select a desired one from the signals reproduced from the VTRs 111-115.

When switch 66 is pressed, the terminal unit 200 is set into a music mode. After switch 66 has been pressed, one of the output signals from modulators 166 and 167 is selected in tuner 204 by pressing switches 67 and the output signal from appropriate one of encoders 151 and 152 is supplied to decoder 205 wherein audio signals L, R and A of the channel selected by the switches 67 (that is, the output of the one of CD players 121-129 selected by the switches 67) are decoded, and the signals L, R are supplied through apparatus 206 to head phones 207.

If menu switch 71 is actuated, decoder 205 decodes menu data stored in memory cartridge 148, the menu data are loaded into microcomputer 209, and microcomputer 209 executes the menu data. As a result, a menu picture (such as that shown in FIG. 4A, for example) is displayed on picture tube 61. The menu picture represents a menu comprising the menu data. The menu data preferably are formed to have a tree structure as shown in FIG. 5, wherein the first menu (identified as the "main menu" in FIG. 5) may have the appearance of menu picture shown in FIG. 4A when displayed. When keys 72 are operated to move the cursor onto a desired menu item, for example the item identified as "DRINKS," and then the enter key 73 is actuated, the apparatus is placed in a mode for selecting "DRINKS" so that the menu (content) corresponding to the menu item "DRINKS" is displayed on the picture tube 61 as shown in FIG. 4B.

Then, if the cursor is put on a desired menu item of the displayed menu by operating cursor keys 72, and the enter key 73 is then operated, the menu item specified by cursor keys 72 and enter key 73 is selected.

Thus, if the above-mentioned operations are carried out in succession, a menu item (a drink) from the "DRINKS" menu is selected.

If the menu item (a drink having specific contents in this case) is selected, data indicative of the selected menu item (drink) and the passenger seat number generated from an address generator 221 (refer to FIG. 1B) are supplied together with a command signal through the up-link, i.e., they are supplied through microcomputer 209, transmitting circuit 219, duplexer 202, antenna 201, leaky cable 171, duplexer 169 and decoder 106 to controller 105, and are further fed to master unit 101, so that unit 101 may cause the passenger seat number and the requested menu item (for example, the drink and the contents thereof) to be displayed on display unit 103.

A passenger attendant may prepare each drink displayed on display unit 103 and deliver them to the appropriate ones of the passenger seats indicated on display unit 103.

If a predetermined input is entered by keyboard 102 (for example when a meal is ready to be served), in accordance with this key input the master control unit 101 supplies a corresponding command to controller 105 and controller 105 supplies a command signal based on this command to CADA encoders 151 and 152 for encoding therein. The encoded command signal is transmitted via the down-link.

After transmission, the encoded command signal is extracted by decoder 205 and, on the basis of the command signal, decoder 205 outputs menu data (which is typically a program stored in memory cartridge 148). This menu data is supplied to microcomputer 209, in which it is used by microcomputer to display a meal menu (such as the meal menu shown in FIG. 4C, which is also listed as an item on the main menu shown in FIG. 4A) on picture tube 61.

The meal menu is also preferably formed to have a tree structure of the type mentioned above, so that the passenger can sequentially select a desired item from the meal menu by operating the cursor keys 72 and the enter key 73. Thus, when the passenger finally selects the desired menu items from the meal menu, a request signal indicating the selected menu item is supplied through the up-link to display unit 103, and hence, the display unit 103 displays in summary form the orders of respective passengers and the number of passengers who have selected each menu item.

This display permits the attendants to prepare the requested meals and deliver them to the appropriate respective passenger seats in accordance with the displayed data.

The contents of the display, or the program and data stored in memory cartridge 148 can be rewritten by master control unit 101 through master controller 105.

If the menu item labeled "GAME" is selected from the initial menu picture (shown in FIG. 4A), the "GAME" menu is displayed. The "GAME" menu includes a list of television game names.

Accordingly, if the cursor is positioned on a desired game name by operating cursor keys 72, and if the enter key 73 is then actuated, the television game software specified by the cursor, that is, the selected game software from the memory cartridges 141 to 147 is loaded from decoder 205 to microcomputer 209. Thereafter, the user can play the television game loaded in microprocessor 209, such as by using the joy stick 208.

As described above, the passengers can freely select and utilize signals from VTRs 111-115, CD players 121-129 and game programs from cartridges 141-147 in the system's normal operating mode.

A signal including data indicative of software usage at each terminal unit 200 is sent automatically from microcomputer 220 to transmitter circuit 219 to be transmitted over the up channel. Each such signal is then supplied through duplexer 202, antenna 201, cable 171, and duplexer 169 to decoder 106 wherein the original software usage data is decoded. The data thus decoded is supplied through controller 105 to unit 101 for use in monitoring and managing the software usage at each seat.

When the announce mode is effected, a command signal indicative of the announce mode is delivered through the down channel to each of terminal units 200. The command signal is decoded in each decoder 205. Decoder 205 is forced by the command signal to select the channel through which the announce voice signal is transmitted from microphone 131 through encoder 151 to the terminal units 200. This voice signal is supplied to head phones 207. During an announce operation, the volume of the signal at head phones 207 may be controlled so as to be unaffected by the position of volume adjuster 74.

If encoder 151, encoder 152, or decoder 205, is disabled due to a malfunction or the like, the announce audio signal A from modulator 161 is automatically selected.

Also during the announce mode, a video signal V representative of an image corresponding to the announcement is extracted from CD-ROM player 115 and forcedly received by tuner 203. Then, the video signal V is supplied to display 61 to display a still image corresponding to the announcement.

When an announce operation is terminated, each terminal unit 200 is returned to the state it was in before the announce mode, in response to receipt of a command signal indicating termination of the announce operation.

When an override operation is effected, the signals V, L, R and A from VTR 110 are forcedly selected by a command signal indicative of the override operation, in the same manner as for the announce operation. The signal V is supplied to display 61 and the signals L, R and A to head phones 207.

Further, when reading light switch 62 is pressed, microcomputer 220 generates a request signal which indicates the number of the seat at which the reading light switch 62 has been pressed. An address from address generator 221 is added to the request signal and the request signal (with address) is transmitted to controller 105 through the up channel. Controller 105 generates a command signal (including the seat number) for lighting the reading light 212 corresponding to the seat number on the basis of the request signal transmitted thereto. The command signal for lighting reading light 212 is transmitted through the down channel to the terminal units 200. The decoder 205 of the terminal unit at which switch 62 has been pressed detects the coincidence between its seat number and the seat number included in the command signal for lighting the reading light 212 and decodes the command signal. The decoded command signal is then supplied to PSU 211 to control a switch therein to turn on the reading light 212.

At this time, controller 105 supplies unit 101 with data indicating that reading light switch 62 has been pressed and data indicative of the seat number of the corresponding seat so that unit 101 may collect and process information regarding which of reading lights 212 have been lighted and which have been extinguished. This information may be displayed on display 103 so that the crew can quickly confirm at which seats the reading light 212 is lit.

A request signal for extinguishing a desired one of reading lights 212 is generated by pressing switch 62 again. The process for extinguishing reading light 212 is the same as that described above for turning on reading light 212.

If a request signal for turning on or off a certain reading light 212 is entered using keyboard 102 and supplied from keyboard 102 to controller 105, a command signal is generated in controller 105. This command signal, which includes a command to turn on or off the reading light 212 and the light's seat number, is supplied through the down channel to the corresponding terminal unit 200, and the appropriate reading light 212 is turned on or off in response to the signal. Accordingly, a reading light 212 or the like at each seat can be controlled from unit 101.

Also, when attendant call switch 63 is pressed, call light 213 is lit, and the attendant call requests are processed by units 105 and 101 and displayed on display 103 in the same manner as when reading light switch 62 is pressed to request that reading light 212 be turned on or off.

Therefore, the crew can quickly determine by examining display 103 each seat at which the attendant call switch 63 has been pressed without going to the passenger cabin.

Moreover, the seat condition detected by each sensor 214 is also transmitted to controller 105 with the corresponding seat number for forwarding to unit 101 for processing.

As described above, according to the present invention, when a passenger or attendant inputs appropriate data by operating keys provided at one of terminal units 200 or at head end apparatus 100, a menu is displayed on picture tube 61 at one or more passenger seats. Then, if a passenger selects a menu item comprising part of the displayed menu (by operating the "enter" key), a request signal indicating the selected menu item is supplied to master control unit 101 so that the attendant can immediately know which item the passenger has requested, so that speedy service can be provided by the attendant. Further, since the attendant does not need to visit the passenger seats to know the requests of the passengers, the invention reduces the labor that must be performed by the attendants.

Each passenger, while seated on a passenger seat, can freely select any of a variety of menu items. Since such menu items (comprising the menu data) are displayed on picture tube 61 of each passenger's seat, they are easy to see. If the menu data to be displayed has a tree structure as described above, desired menu items can easily be selected in an interactive way.

Further, in a preferred embodiment in which the service system of the invention is combined with an audio/video system to form one combined system, the combined system is simpler, and may more easily be extended than if the two systems were provided separately.

Furthermore, since passenger conditions and requests are controlled and monitored from the head end apparatus, the invention facilitates efficient provision of various services, such as the provision of software and a variety of meals, to the passengers from head end apparatus 100.

Next, the signal format of the time-division-multiplexed signals outputted by encoders 151 and 152 will be explained with reference to FIGS. 6A-6C. The signal format is improved from that disclosed in aforementioned U.S. Pat. No. 4,684,981.

Multiplexed signal St shown in FIG. 6A, is a serial binary signal formed of a number of super-frames. One super-frame thereof is formed of 256 frames F1 through F256. As shown in FIG. 6B, each frame includes 168 bits and the cyclic period of one frame is $(32 \text{ kHz})^{-1}$. Each frame has an 8-bit synchronizing code SYNC, followed by a 4-bit service bit SB, followed by four 32-bit data packets PCTA-PCTD, followed by four 7-bit error correcting codes (ECCs).

There are two kinds of synchronizing code SYNC as shown in FIG. 6A: a super-frame-sync SS for the frame F1 at the head of the super-frame and a frame-sync FS for the subsequent 255 frames F2-F256. The bit patterns of super-frame-sync SS and frame-sync FS are selected to differ from each other.

The service bits SB, the details of which will be provided below, are grouped into four groups each including 77 bits. Each service bit contains data such as a command, a seat number, and so on.

Each of data packets PCTA-PCTD is formed of 32 bits and is independent of the others. As shown in FIG. 6C, each of the packets PCTA-PCTD is divided into four channels M1-M4, each being formed of 8 bits. Each of the channels M1-M4 contains a PCM signal obtained by sampling the audio signals L, R and A at a frequency of 32 kHz.

Since one frame contains four packets PCTA-PCTD and each packet has four channels M1-M4, 16-channel audio signals can be simultaneously transmitted in time-division multiplexed form by the use of one signal St. Each channel is sampled at a sampling frequency of 32 kHz and encoded in 8 bits, so that it complies with the PCM audio standard of an 8 mm video tape recorder (VTR).

Data signals from the memory cartridges 141 through 148 are converted into a time-division multiplexed bit sequence signal by multiplexer 149 (shown in FIG. 1A). The time-division multiplexed signal emerging from multiplexer 149 is used as one channel of the 16-channel signals. The signal emerging from multiplexer 149 is cyclic, so that when the last bit of data from memory cartridges 141 through 148 is transmitted, the first bit of the data from these memory units is retransmitted.

Each channel of the FIG. 6C signal is formed of eight bits, and eight memory cartridges 141-148 are provided. Accordingly, in the channel for transmitting data from cartridges 141-148, each of the first bit through the eighth bit of the channel corresponds to data from a different one of memory cartridges 141 through 148. Therefore, the transmission rate of data from each memory cartridge is 32 kbps.

The four error correcting codes ECCs respectively correct errors which may occur in the packets PCTA-PCTD.

Since the signal St has format determined as described above, the bit transmission rate thereof is calculated as follows:

$$168 \text{ bits} \times 32 \text{ kHz} \approx 5.4 \text{ Mbps.}$$

One half of the calculated value is the Nyquist frequency, so that he signal St can be transmitted in a video signal bandwidth.

As described above, each of the encoders 151 and 152 can time-division-multiplex sixteen channels of audio signals, and the time division-multiplexed signal can be frequency-multiplexed with other video signals.

The service bits SB are preferably used in groups having a format as shown in FIGS. 7A-7D. To be specific, four service bits SB are provided for every frame, and may be designated $B_1$-$B_4$. Assuming that continuous 77 frames are vertically aligned as one group, as schematically shown in FIG. 7A, the service bits SB for this group have a dimension of vertical 77 bits × horizontal 4 bits.

As shown in FIG. 7B, the service bits SB may be vertically grouped so that each set of 77 bits is designated as one channel. A first such channel CHNA includes 77 bits $B_1$ and second - fourth such channels CHNB-CHND include bits $B_2$s-$B_4$s, respectively.

Each of the channels CHNA-CHND is divided into seven words WRDA-WRDG, each being formed of 11 bits as shown in FIG. 7B. Each word has its first bit set to "0" level and used as a start bit STRT, the subsequent eight bits are used as data bits DTBT, the next one bit used as a parity bit PRTY, and the last one bit determined to be "0" level and used as a stop bit STOP, as shown in FIG. 7C.

There is one data bit DTBT for each word in each of the channels CHNA–CHND, and there are seven words for each 77 frames. Therefore, there are seven data bits (seven bytes) for the 77 frames. Accordingly, there are 7 bytes×4 channels of the data bits DTBTs in all.

As shown in FIG. 7D, the second channel CHNB has its first byte set in a predetermined bit pattern ("AA" in hexadecimal) and is used as a header HDER, its second byte is used as a command CMD for identifying a maximum of 256 kinds of commands, the third and fourth bytes are used as an address ADRS indicative of a seat number (or a number of identifying a particular terminal unit), the fifth and sixth bytes are used as status information STTS indicative of data or parameters incident to the command CMD, and the last byte used as a check sum CS.

Therefore, transmitter 100 can specify desired ones of the terminal units 200 and control the operation of each corresponding reading light 212 and attendant call light 213 by use of the data bit DTBT in channel CHNB.

Since there is only one up channel for random data, the data bit DTBT of the first channel CHNA is used as a flag indicative of use or non-use of the up channel for the random data. The flag is set when the random data of the up channel is used. Therefore, each terminal unit 200 judges whether or not the up channel for random data can be used by assessing data bit DTBT of the channel CHNA. If the channel is in use, the terminal unit 200 delays transmission of a command (and data) to transmitter 100 until the channel becomes vacant.

The third and fourth channels CHNC and CHND are not defined.

In the up channel, above-mentioned service bits SB are transmitted in the formats shown in FIGS. 7B–7D at a bit rate of 32 kbps, equal to that of down channel transmission, in the PSK (phase-shift keying) signal state.

While the above-described embodiments of the invention have been described for the case that the system of the invention is installed in an aircraft, it is contemplated that the invention may alternatively be implemented in any other passenger vehicle having a plurality of passenger seats, such as a bus or a train.

FIG. 8 shows a preferred embodiment of the service system of the invention which is installed in an aircraft. The components in FIG. 8 corresponding to those in FIGS. 1A and 6A are designated by the same reference numerals. The cartridges 141–148 and the controller 105 of FIG. 1A are accommodated in a box 300, and the encoders 151 and 152, the modulators 161–167, the adder 168 and the duplexer 169 are accommodated in a box 400.

According to the present invention, as described above, when a passenger or attendant inputs appropriate data by operating keys provided at one of terminal units 200 or at head end apparatus 100, a menu is displayed on picture tube 61 at one or more of the terminal units 200. Then, if a passenger selects a menu item from this displayed menu (for example, by pressing the enter key 73) a request signal indicating the selected menu item is transmitted to master control unit 101 so that the attendant can promptly learn of the passenger's request, thus making it possible to carry out the requested service rapidly. Further, since the attendant does not need to visit the passenger seats to learn the requests of the passengers, the invention considerably reduces the labor that must be performed by the attendants.

Each passenger, while seated on a passenger seat, can freely select any of a variety of menu items. Since such menu items (comprising the menu data) are displayed on picture tube 61 of each passenger's seat, they are easy to see. If the menu data to be displayed has a tree structure as described above, desired menu items can easily be selected in an interactive way.

Further, in a preferred embodiment in which the service system of he invention is combined with an audio/video system to form one combined system, the combined system is simpler, and may more easily be extended than if the two systems were provided separately.

Furthermore, since passenger conditions and requests are controlled and monitored from the head end apparatus, the invention facilitates efficient provision of a wide variety of services, such as the provision of a variety of software and a variety of meals, to the passengers from head end apparatus 100.

It will be apparent from the foregoing description of several preferred embodiments of the invention that many modifications and variations could be effected by one skilled in the art without departing from the scope of the invention, as determined by the appended claims.

We claim as our invention:

1. A passenger vehicle service system, comprising:
   a head end apparatus having memory means for storing menu data, and means for recovering said menu data for subsequent transmission, where said menu data includes at least one menu and each menu includes at least one menu item;
   a plurality of terminal units, each provided at a respective one of a plurality of passenger seats, each of the terminal units having means for displaying said menu data, means for selecting said at least one menu item from among the displayed menu data, and means for generating a request signal which indicates the at least one menu item selected by the selecting means and which also includes an address signal identifying said each terminal unit; and
   means for transmitting said menu data from said head end apparatus to the terminal units and for transmitting the request signals from the terminal units to the head end apparatus.

2. A service system according to claim 1, in which said head end apparatus further comprises a controller means for receiving the request signals from the terminal units and processing the request signals for display.

3. A service system according to claim 2, in which said head end apparatus further comprises display means connected to said controller means for displaying the processed request signals received from the controller means.

4. A service system according to claim 2, in which said head end apparatus further comprises keyboard means connected to the controller means for sending a command to the controller means for instructing the controller means to generate a command signal for transmission to the terminal units, where the command signal is capable of causing the terminal units to display said menu data transmitted from the head end apparatus.

5. A service system according to claim 3, in which said head end apparatus further comprises an encoder means for digitally encoding said menu data, and said each terminal unit comprises a decoder means for decoding said encoded menu data.

6. A service system according to claim 5, in which said menu data include a list of meals and a list of drinks.

7. A service system according to claim 5, in which said selecting means comprises a cursor up key and a cursor down key for selecting said at least one menu item from among said displayed menu data and an enter key for sending a selection by one of said cursor up key and said cursor down key to said request signal generating means.

8. A service system according to claim 5, in which said head end apparatus further comprises means for storing television game software data and recovering said television game software data for transmission to the terminal units, wherein said menu data includes a list of television games included in said television game software data, wherein said encoder means is capable of encoding said television game software data as well as said menu data, and wherein each of the terminal units further comprises means for processing each television game selected by the selecting means.

9. A service system according to claim 8, in which said menu data include a list of meals, a list of drinks and a list of television games.

10. A service system according to claim 8, in which said head end apparatus also includes means for reproducing video signals and means for reproducing audio signals, wherein said audio signals are encoded by said encoder means, and wherein the head end apparatus also includes modulator means for modulating said video signals, said encoded menu data, and said encoded audio signals, and a multiplexer means for multiplexing said modulated video signals, said modulated encoded menu data, and said modulated encoded audio signals, and wherein said each terminal unit also includes means for receiving said multiplexed signals, and a demodulator means for demodulating said modulated video signals, said modulated encoded menu data, and said modulated encoded audio signals, and for supplying the demodulated encoded audio signals and the demodulated encoded menu data to the decoder means, wherein the demodulated encoded audio signals are decoded by said decoder means, and wherein said each terminal unit also includes a means for selecting desired ones of said modulated video signals and modulated said audio signals, and an audio output terminal for receiving the selected demodulated, decoded audio signals.

11. A service system according to claim 10, in which said each terminal unit further comprises a game terminal connected to the television game processing means for receiving television game play signals and routing the television game play signals to the television game processing means, and a game controller connected to the game terminal for generating the television game play signals.

12. A service system according to claim 11, in which said each terminal unit includes a panel in which the menu selecting means, the means for selecting video signals and audio signals, the audio output terminal, and the game terminal are provided.

13. A service system according to claim 12, in which at least one said panel is provided on the rear side of one of said passenger seats.

14. A service system according to claim 11, in which said transmitting means is a cable.

15. A service system according to claim 14, in which said passenger vehicle is an aircraft.

16. A passenger vehicle service method, including the steps of:
(a) at a head end apparatus, generating menu data including at least one menu, where said at least one menu includes at least one menu item;
(b) transmitting the menu data from the head end apparatus to a plurality of terminal units, each provided at a respective one of a plurality of passenger seats;
(c) at each of the terminal units, displaying said at least one menu, and generating a request signal indicative of said at least one menu item from said at least one menu and also including an address signal identifying the passenger seat at which the request signal is generated; and
(d) transmitting each request signal from the terminal unit at which it is generated to the head end apparatus.

17. A method according to claim 16, also including the steps of:
(e) digitally encoding of the menu data at the head end apparatus, before transmitting the menu data to the terminal units; and
(f) decoding the encoded menu data at said each terminal unit before displaying the at least one menu.

18. A method according to claim 16, also including the steps of:
receiving the request signal from the terminal units at the head end apparatus, and processing the received request signal for subsequent display at the head end apparatus.

19. A method according to claim 18, also including the step of:
displaying the request signals at the head end apparatus after they are processed for display.

20. A method according to claim 18, also including the steps of:
within the head end apparatus, generating a command signal capable of causing the terminal units to display the menu data transmitted from the head end apparatus; and
transmitting the command signal from the head end apparatus to the terminal units.

21. A method according to claim 20, wherein the request signal and the menu data are transmitted to and from the head end apparatus, respectively.

* * * * *